United States Patent [19]
Boutte et al.

[11] Patent Number: 5,775,852
[45] Date of Patent: Jul. 7, 1998

[54] APPARATUS AND METHOD FOR ADDING DRY MATERIALS TO LIQUID DRILLING MUD SYSTEM

[75] Inventors: Kenneth J. Boutte, Erath; Ban D. Green, New Iberia, both of La.

[73] Assignee: Pro Line Systems, Inc., Lafayette, La.

[21] Appl. No.: 616,700

[22] Filed: Mar. 15, 1996

[51] Int. Cl.$^6$ ............................................. B65G 53/24
[52] U.S. Cl. ...................... 406/32; 406/24; 406/120; 406/130; 406/145
[58] Field of Search ...................... 406/19, 24, 29, 406/31, 32, 120, 130, 145, 151, 152, 153, 168, 171, 172

[56] References Cited

U.S. PATENT DOCUMENTS

| | | | |
|---|---|---|---|
| 3,077,365 | 2/1963 | Fisher | 406/120 X |
| 4,249,839 | 2/1981 | Vance | 406/120 X |
| 4,345,858 | 8/1982 | Barlow | 406/120 X |
| 4,944,347 | 7/1990 | Richard et al. | 166/278 |
| 5,303,998 | 4/1994 | Whitlatch et al. | 366/3 |
| 5,415,232 | 5/1995 | Johnson et al. | 166/307 |
| 5,507,602 | 4/1996 | Walker | 406/151 X |

*Primary Examiner*—Andrew C. Pike

[57] ABSTRACT

A method and apparatus (10) for delivering dry bulk material (21) to a drilling mud system (50) of an oil and gas well comprises a plurality of collapsible bags (30) for holding a quantity of dry bulk material (21), each bag (30) being supported on a bag storage rack (20) having a discharge outlet (22) connected to the bags (30), the discharge outlets (22) having bag discharge valves (24); a hopper (40) for receiving and collecting material from the bags (30) and for discharging material into the drilling mud system (50) by means of a hopper discharge valve (48); a length of material discharge hose (70) connected to the discharge outlets (22) and to the hopper (40); and a vacuum pump (60) having a vacuum hose (47) to the hopper (40) for producing a vacuum in the hopper (40) and the hose (70) and thereby drawing material (21) from the bags (30) into the hopper (40) for discharge into the mud system (50). The racks have load cells (25) for measuring the weight of material in the bags and the load cells (25), the hopper discharge valve (48); and the bag discharge valves (24) may be connected to a programmable control panel (65) for remotely controlling the flow of material from each of the bags (30) to the hopper (40).

20 Claims, 4 Drawing Sheets

APPARATUS AND METHOD FOR ADDING DRY MATERIALS TO LIQUID DRILLING MUD SYSTEM

FIELD OF INVENTION

The present invention generally relates to the field of drilling wells for the exploration and production of hydrocarbons, and more particularly, relates to a method and apparatus for adding dry, powdered components to the drilling mud system of a drilling rig employing reusable bags and pneumatic lines

BACKGROUND OF INVENTION

In the field of hydrocarbon exploration, during the drilling of wells to recover oil and gas, it is necessary to circulate a liquid drilling mud down the drilling pipe to the bottom of the well bore and up the well bore to the surface. This drilling mud keeps the geologic formations surrounding the well bore in place and enhances and maintains the ability to move the drill pipe up and down the well. Drilling mud of different weights and viscosities are required depending upon the depth of the well, the geologic formations encountered and the diameter of the well bore. Consequently during the drilling of an oil and gas well, it is necessary to continuously monitor the drilling mud and change physical characteristics and properties of the mud as new situations are encountered. These physical characteristics might include viscosity and specific gravity among others.

A typical drilling mud system for an oil and gas well drilling rig includes a mud holding tank, usually positioned at the well surface on or adjacent to the drilling rig, and a network of pumps, mixers, and mud supply lines that run to and from the well bore.

The mud holding tank is used to hold the various dry and liquid components of the drilling mud as they are mixed into liquid slurry to produce a drilling mud of the desired physical properties and characteristics. The drilling mud is then pumped from the mud holding tank through the mud supply lines and circulated through the well bore at the desired rate.

The physical characteristics and properties of the drilling mud are altered by the addition of liquids such as water as well as dry powdered or granular additives or chemicals. These powdered additives or chemicals are typically packaged in paper bags which may typically weigh in excess of fifty pounds. Bags of dry drilling mud components are typically manually loaded in a storage area on the rig or at the well site in an out-of-the-way location. When needed the bags of mud components are typically manually carried to the mud holding tank and their contents are dumped into the mud holding tank by rig workers. Manually carrying and dumping the bags is physically demanding on the rig worker. Further, the method may require a large amount of manpower to accomplish the task if it is necessary to rapidly add bags of material to mud systems to change the physical properties of the drilling mud.

Because of the physical demands of lifting and carrying the bags on the worker, the drilling rig workers are necessarily exposed to the possibility of physical injury; and back injuries among workers are not uncommon. In addition, loading, carrying, and dumping of the bags may expose the drilling rig worker to the dust and fumes generated by the dry powdered materials typically contained in the bags and may create a hazardous environmental risk to the rig workers. Further, a hazardous waste disposal problem is often created by the used empty paper bags remaining after the chemicals are dumped in the mud system.

In addition to the physical and environmental risks associated with storing and handling dry powdered chemicals in paper bags, these types of bags impose significant storage problems at the drilling site. Bag storage typically requires a great deal of space, and storage space is especially valuable in an offshore drilling installation where drilling platform space is finite and often quite limited. Consequently, sufficient bag storage space on a drilling rig is often unavailable or inconveniently located, especially in situations where it is necessary to have on hand at the well site a wide variety of different types of mud components available for use in the drilling mud system. Inconvenient storage space makes it especially difficult to manually move the bags from storage to the mud system.

In addition, during the life of an oil and gas well, especially during well completion or workover operations, it is often necessary to add measured amounts of dry granular or powdered materials to a liquid slurry for pumping the combination into the well bore. These operations present similar problems to those encountered in drilling mud systems. Consequently, a need exists for improvements in the methods utilized for storing and dispensing dry powdered or granular materials to a liquid system for introduction into the well bore of an oil and gas well.

Efforts to improve the handling of dry granular or powdered solids that must be handled in bulk for application into a liquid system have included liquid pumps, drop hoppers for the introduction of solids, mixing tanks, and screw type augers for moving a solids-containing liquid slurry such as that shown in U.S. Pat. No. 4,944,347 to Richard et al. However, Richard et al. does not disclose or suggest a method of adding the dry solids to the hoppers for dispensing into the well bore. Similarly, U.S. Pat. No. 5,415,232 to Johnson et al. discloses a method of distributing selected bulk liquids in predetermined quantities into a well bore but does not discloses a method of storing and adding selected quantities of dry components to a liquid system.

SUMMARY OF INVENTION

The present invention provides an apparatus and method designed to satisfy the aforementioned needs. It describes a method and apparatus for the bulk storage of dry powdered or granular materials at a well location so that these materials can be conveniently added to the liquid drilling mud system in measured quantities. The method and apparatus of the present invention eliminates the need for storing small bags of powdered materials as well as the need for manually carrying and dumping these bags into a mixing tank. The method of the present invention also eliminates the necessity for disposal of the used materials bags.

The method incorporates the use of racks for holding and supporting large reusable materials bags. The bags are stackable and waterproof and of sufficient size to store substantial quantities of dry powdered or granular mud components in bulk. The bags are attached to a discharge outlet having a remotely controllable bag valve which is in turn connected to a materials delivery hose. The material delivery hose is connected to a collection hopper having a remotely controllable hopper discharge valve and outlet for dispensing materials directly into the mud system of the drilling rig. The collection hopper is connected to a pump which produces a vacuum in the hopper and the materials delivery hose when the hopper discharge valve is closed. This vacuum draws the dry powdered materials from the bags, through the delivery hose, into the collection hopper. The racks have load cells connected to a control panel so that measured quantities of materials may be removed from the bags as desired.

Accordingly, the present invention relates to an apparatus and method for storing and dispensing measured quantities of dry powdered or granular materials into the liquid mud system or other liquid injecting system of an oil and gas well. It is an object of the present invention to eliminate the need for manually lifting, carrying, and dumping individual bags of materials. It is also an object of the present invention to provide a method and apparatus for employing large reusable waterproof bags for storing and utilizing dry powdered or granular materials in bulk for use at a well location. It is also an object of this invention to utilize pneumatic vacuum lines for delivering dry materials to a liquid system in an oil and gas well operation. It is an additional object of the present invention to provide a method and apparatus to eliminate the necessity of disposing of paper materials bags.

The present invention includes the steps of providing dry materials in bulk in collapsible bags; supporting the materials bag on racks having remotely controlled valved bag discharge outlets; connecting the discharge outlets to a vacuum line which is in turn connected to a collection hopper having a valved discharge outlet; producing a vacuum in the collection hopper and the vacuum line for drawing the powdered materials from the bags into the collection hopper; and opening the discharge outlet of the hopper and dispensing the materials collected in the collection hopper into the liquid mud system of an oil and gas well.

DESCRIPTION OF THE PREFERRED EMBODIMENTS

Figure 1:
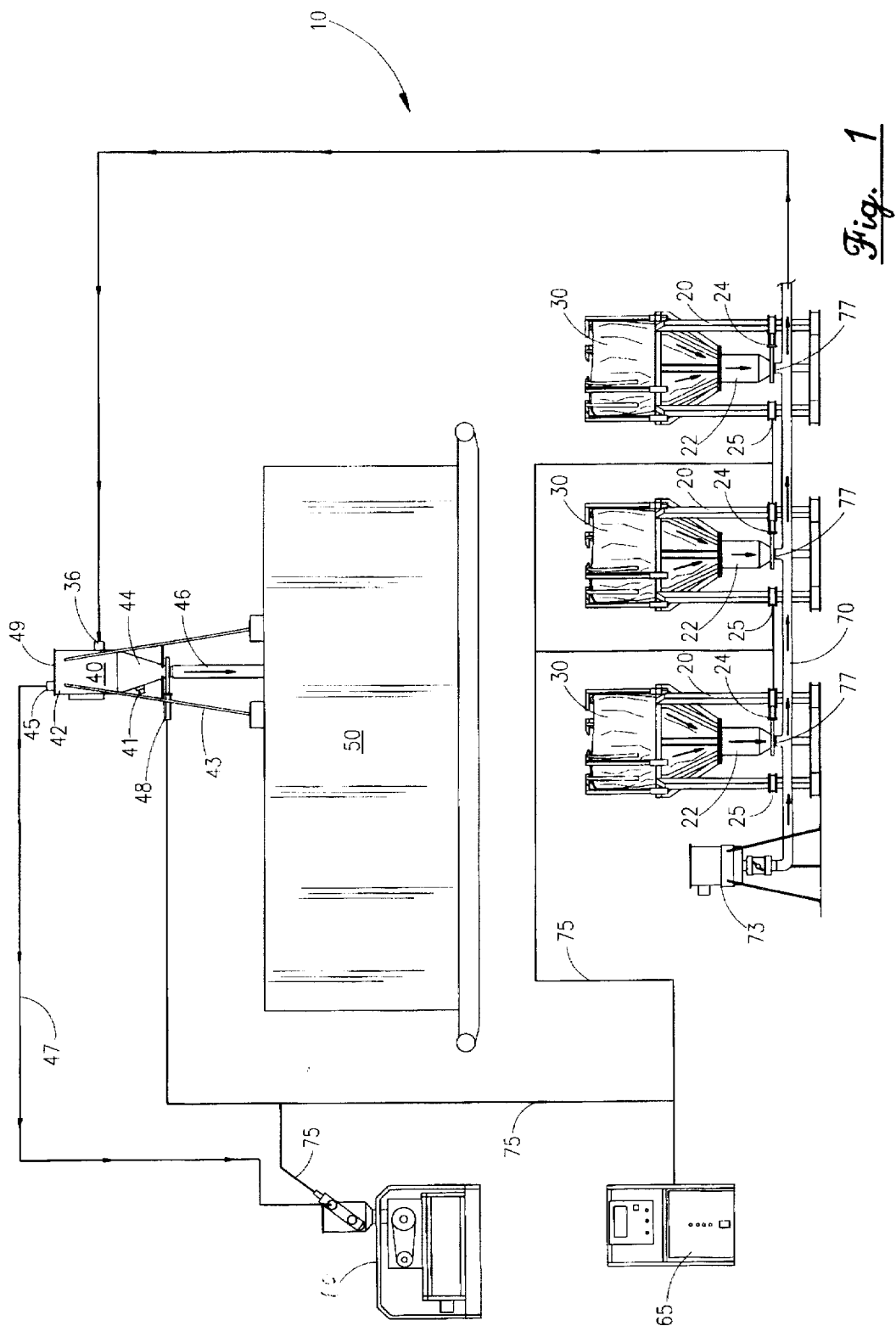
FIG. 1 is a diagrammatic view of a dry bulk materials storage and delivery apparatus in accordance with the present invention.

Referring now to the drawings, more particularly to FIG. 1, there is shown a diagrammatic view of the apparatus 10 for storing and introducing dry powdered materials to a liquid system for injection into a wellbore of oil and gas wells. The system is specifically intend for use in introducing dry materials into the drilling mud system during the drilling of oil and gas wells though it is thought that the system might be conveniently modified for use in other well applications requiring the addition of dry powered or granular material to a liquid slurry system.

The apparatus 10 is comprised of a plurality of bag storage racks 20 for supporting a material storage bag 30, each bag 30 containing a quantity of dry powdered or granular material 21. Each bag 30 has a bag outlet 35 which is sealably connected to a material discharge outlet 22 mounted on the rack 20. The discharge of material 21 from each discharge outlet 22 is regulated by means of a remotely controllable sliding gate bag outlet discharge valve 24. Each discharge outlet 22 is in turn connected by hose or other means to a materials delivery hose 70 by means of a plurality of manifold-like inlet ports 77 protruding from the hose 70 along its length.

One end of the materials delivery hose 70 is connected to an air inlet chamber 73; the other end is connected to a materials inlet port 36 of a collection hopper 40. The materials inlet port 36 allows materials discharged from the bags 30 into the delivery hose 70 to be delivered into the hopper 40.

In the preferred embodiment, the collection hopper 40 has a hollow cylindrical tank section 42 and a conical outlet section 44 which transitions in a funnel-like manner to a discharge stub outlet 46. The discharge outlet 46 has a remotely controllable sliding gate hopper discharge valve 48 that opens and closes to dispense material 21 from the collection hopper 40 into the liquid mud system 50 of a oil and gas well drilling rig. In the preferred embodiment, the collection hopper 40 is supported by a hopper platform or stand 43 so that when the hopper discharge valve 48 is opened, the material 21 in the collection hopper 40 may be discharged directly from the hopper discharge outlet 46 and directed into the liquid mud system 50 by gravity. A vibrator 41 is attached to outside of the hopper 40 to stimulate material flow from the collection hopper 40 to the discharge outlet 46.

The collection hopper 40 has a removable top portion 49 that fits over the cylindrical tank section 42 for sealing the hopper 40. The top portion 49 has a vacuum stub opening 45 for connecting to one end of a length of vacuum hose 47. The other end of the vacuum hose 47 is then connected to the suction end of a vacuum pump 60. A filter, not shown, is typically placed in the top section of the hopper to assist in the control of any dust that might be created in the hopper 40 when the vacuum pump 60 is turned on.

In operation, a selected number of bags 30 are each positioned on a bag storage rack 20 and their respective bag outlets 35 are connected to the rack discharge outlets 22. With the vacuum pump 60 on and with the hopper discharge valve 48 closed, material 21 from the bags 30 will be drawn into and through the material delivery hose 70 into the collection hopper 40 by means of the vacuum created in the tank 40 by the vacuum pump 60 as long as the discharge valve 24 for that particular bag 30 is opened. When the discharge valve 24 for any bag 30 is closed, material from that bag will cease to flow. In this way, bags containing different types of material may be connected to the hose 70 and the operator may select material from any one of the bags 30 for delivery into the hopper 40. When the desired amount of material is delivered to the hopper 40, the bag discharge valves 24 are closed, the pump 60 is turned off, and the hopper discharge valve 48 is opened to allow the materials collected in the hopper 40 to be discharged into the mud system 50.

In the preferred embodiment, each bag storage rack 20 is equipped with a plurality of load cells 25 for continuously measuring the weight of each bag 30 from moment to moment as material is discharged from the bag during operation of the system. These weight changes can then be monitored so that the discharge valve 24 may be closed when the desired amount of material exits the bag 30 and enters the material delivery hose 70. Preferably, each bag outlet discharge valve 24, the hopper discharge valve 48, the pump 60, and the load cells 25 are connected to a programmable control panel 65 by leads 75 so that the entire system may be automatically and remotely monitored and controlled. The control panel may be programmed to monitor the weight of material in each bag 30 and to control each valve 24 so as to allow material to flow from a selected bag 30 in a desired amount and in a desired sequence. The leads 75 can be electrical, pneumatic, or hydraulic as necessary to operate the particular value or pump. However, the system may be manually monitored and operated without departing from the spirit or scope of the present invention.

Figure 2:
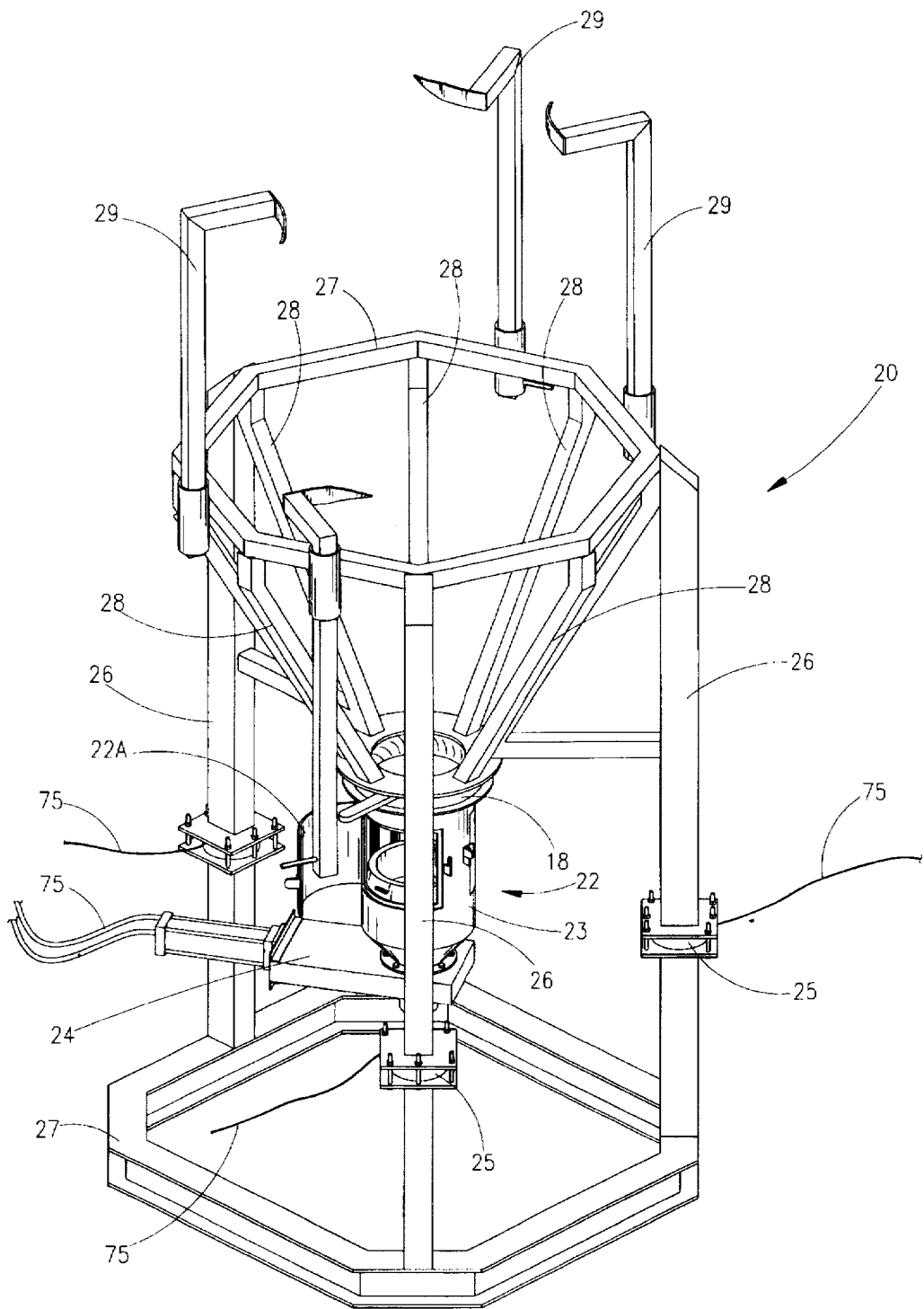
FIG. 2 is a perspective view of the bag storage rack used in the apparatus of FIG. 1.

FIG. 2 shows a perspective view of a bag storage rack 20 for mounting and supporting a material storage bag 30 containing a quantity of material 21. In the preferred embodiment each storage rack 20 has a plurality of vertical support legs 26 connected together on their upper and lower ends by a framework 27. The vertical supports 26 have load cells 25 for monitoring the weight of the bags 30. The framework 27 includes a plurality of diagonal bag supports 28 which are positioned at a 60° angle from the horizontal, it being thought that supporting the bag 30 by supports 28 at an angle of approximately 60° will provide the best flow of material from the bag 30. The rack 20 has a plurality of vertically adjustable bag hooks 29 for attachment to the bag 30. Mounted below the bag supports 28 is a material discharge outlet 22. The discharge outlet 22 has a remotely controllable valve 24 for regulating material flow.

Figure 3:
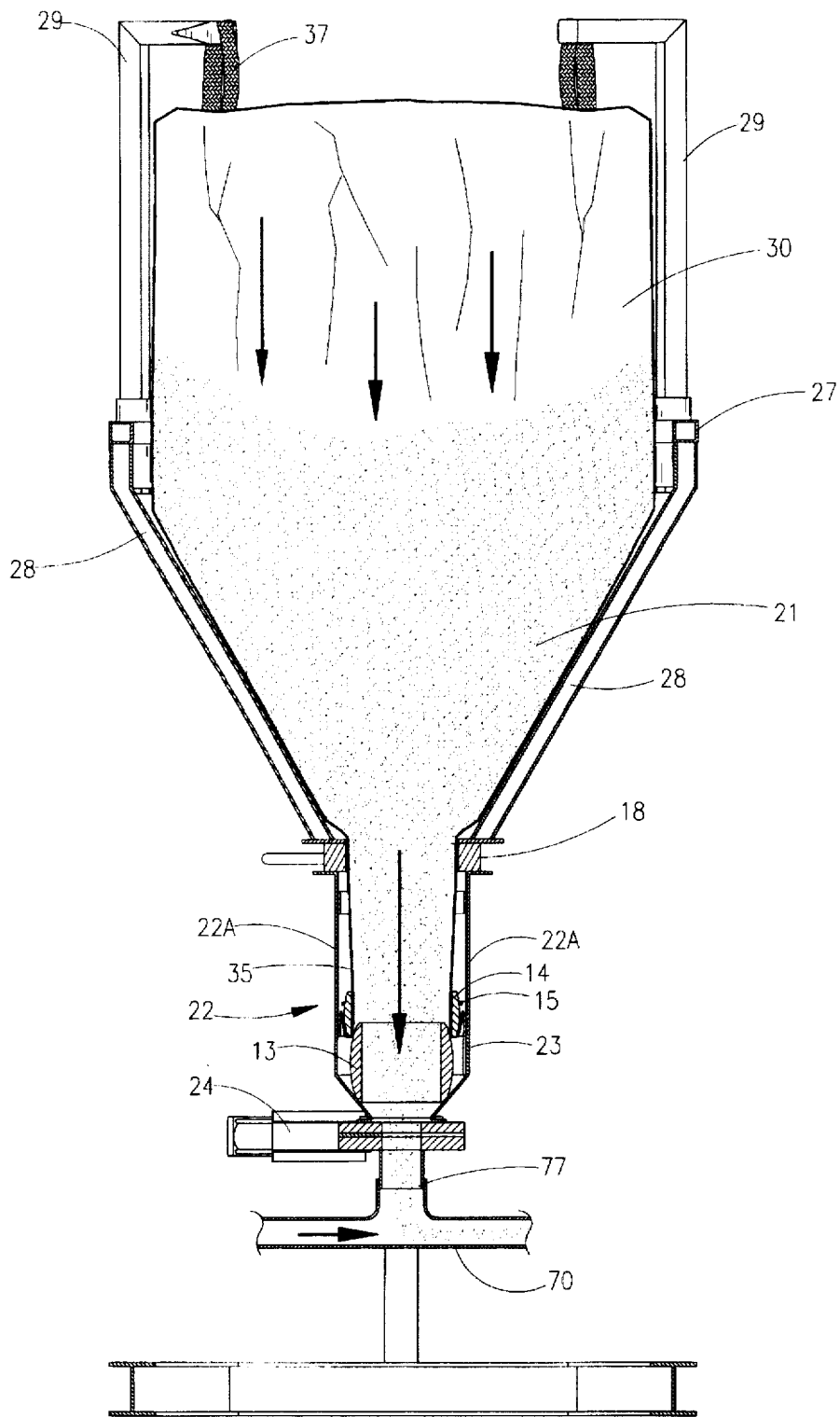
FIG. 3 is a cross-sectional view the bag and bag storage rack used in the apparatus of FIG. 1.
Figure 4:
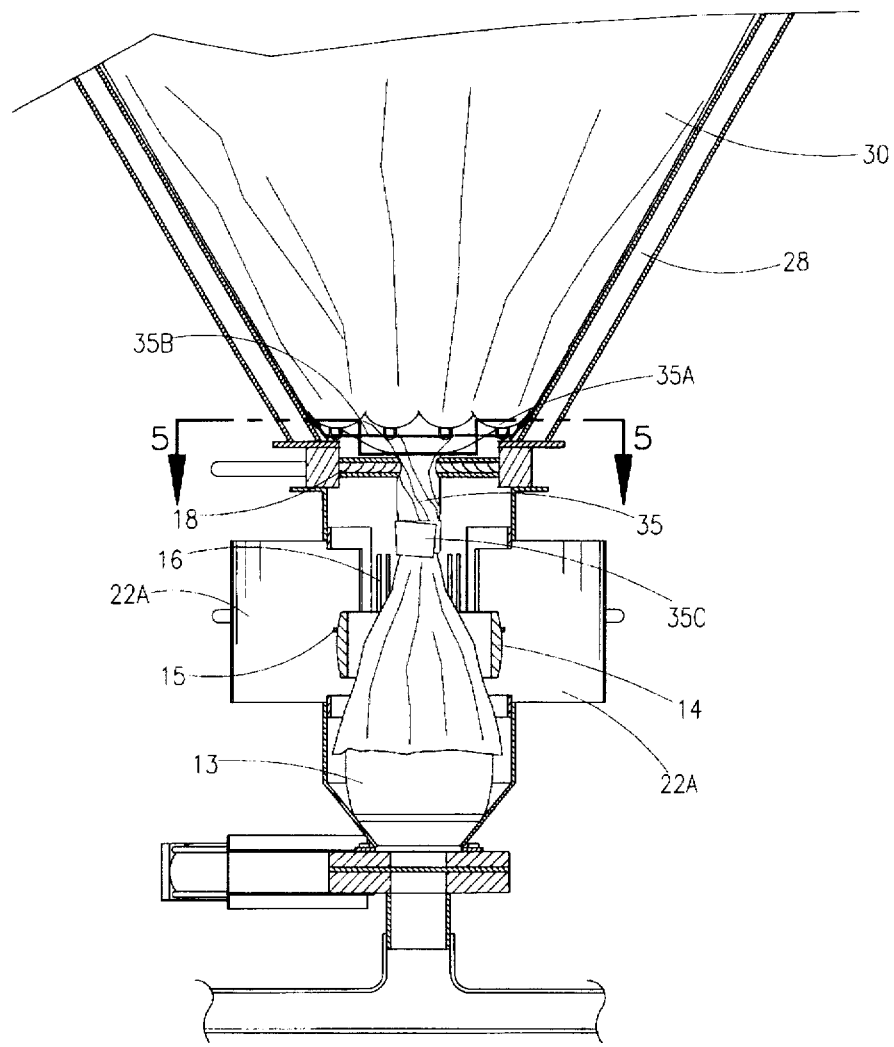
FIG. 4 is cut-a-way cross-sectional view of the bag storage rack and bag discharge outlet used in the apparatus of FIG. 1.
Figure 5:
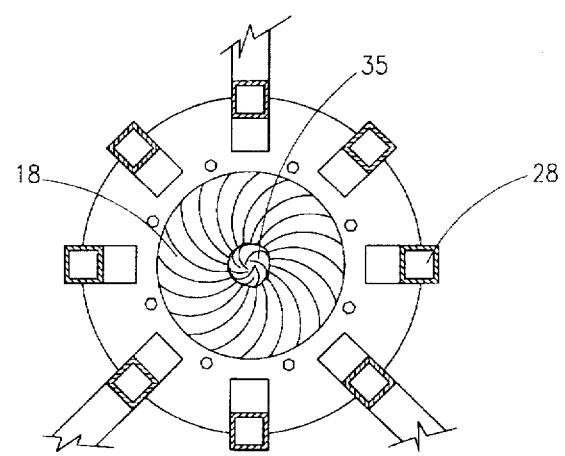
FIG. 5 is a partial plan view, cut along reference line 5—5 of FIG. 4, showing the iris valve for the bag discharge outlet.

As shown in FIGS. 3 and 4, the bags 30 are made of waterproof fabric material such as reinforced vinyl or plastic coated fabric material. Ideally, they are sized to hold 50 cubic feet of material and compress to be folded and stackable when empty. The bag 30 is secured to the bag hooks 29 on the framework 27 of the storage rack 20 by means of straps 37 mounted to the bag 30.

The bag 30 has a tubular-shaped fabric outlet 35 extending outward from the bag 30. The outlet 35 is sealed by means of a circular inner outlet flap 35A, an inner flap cinch cord 35B, and an outer outlet flap 35C having a hook and loop fastener or other closing means. To seal the outlet 35 of the bag 30, the inner outlet flap 35A is placed over the opening of the bag outlet 35, and the cinch cord 35B is pulled tight to close and secure the inner flap 35A over the opening of the bag outlet 35. The bag outlet 35 is then sealed by means of wrapping the outer flap 35C around the bag outlet 35. Other bag sealing means may be also utilized. Bags 30 are known in the art, an example of which is the super bag manufactured by BAG Corporation of Dallas, Tex.

The bags 30 are typically pre-loaded with material 21 away from the well site with the desired type and quantity mud component material and transported to the well location. The full bags 30 are then placed onto the storage racks 20 by hoists, crane, or other means. Once the bags 30 are secured to and supported on the framework 27 of the storage racks 20, the bag outlet 35 of each bag 30 is connected to the discharge outlet 22 contained in each storage bay.

As shown in FIGS. 3 and 4, the discharge outlet 22 is comprised of a vertically oriented tubular housing 23 having access doors 22A. Positioned within the housing 23 is a vertically oriented rigid annular inner collar 13 and a rigid annular outer collar 14. The outer collar 14 is slidably positionable vertically over the inner collar 13. The collar 14 may be held above the collar by means of dogs 15 on the outside of the collar 14 that fit into a vertical keyway 16 on the inside of the housing 23. The base of the discharge outlet 22 is connected to the remotely controllable sliding gate bag outlet discharge valve 24 which is in turn connected to material inlet 77 of the material delivery hose 70. Sliding gate valves are well known in dry bulk materials applications and an example of a suitable sliding gate bag outlet discharge valve 24 would be the Clear Action Gate™ manufactured by Salina Vortex Corporation of Salina, Kans.

Attached to the top of the discharge outlet 22 is an iris diaphragm valve 18. The iris valve 18 is used to open and close the bag outlet 35 during the installation and removal of the bag 30 from the bag storage rack 20. Iris diaphragm valves are well known in dry bulk materials applications and an example of such a valve is the MUCON® iris diaphragm valve manufactured by Kemutec, Inc. of Bristol, Pa.

The connection of the outlet 35 of bag 30 to the discharge outlet 22 is accomplished by first holding the outer collar 14 in a position above the inner collar 13 by means of the dogs 15 and keyway 16, pulling the outlet 35 through the iris diaphragm valve 18, closing the diaphragm valve 18, pulling the outlet 35 through the outer collar 14 and over and around the inner collar 13, and then dropping the outer collar 14 over the bag outlet 35 and the inner collar 13. This will seal the bag outlet 35 between the inner collar 13 and the outer collar 14. The bag cinch cord 35B and flap 35C can then be loosened so as to allow the inner flap 35A to fall open. Partially full bags may be removed from the bag storage rack by reversing the installation steps.

The entire apparatus 10 can be trucked to the well location for installation or, in the case of offshore well locations, the apparatus 10 can be brought to the well location by boat. The various components of the apparatus 10 may be configured and positioned at the well location in a variety of ways. Because of the flexible material delivery hose 70, the bag storage rack 20 can be placed at any convenient location around the drilling rig, and because the length of the materials delivery hose 70 can be varied the hose can be routed to conform to a variety of rig layouts. This flexibility allows the bag storage racks 20 to be located at a variety of elevations. Similarly, the pump 60 may also be placed at a convenient location on the well site as the vacuum hose 47 may be varied in length and conveniently routed to the hopper 40. The control panel 65 can also be located at a convenient location and still be connected by leads 75 to the load cells 25, the valves 24 of bag storage rack 20, the valve 48 of the hopper 40, and to the pump 60 to remotely control each of these components.

Supplying the drilling mud components in bulk quantities in the materials storage bag 30 and delivering the materials from the bags 30 to the mud system 50 by means of the vacuum produced in the material delivery hose 70 eliminates the need for manually lifting carrying and dumping bags of mud materials. The apparatus 10 allows the rig worker to avoid the risks associated with manually performing those operations. The reusable bag 30 also eliminates the problems associated with bag disposal.

The present invention includes the method comprising the steps of supplying a plurality of materials storage bags 30 containing the desired materials to the well location, supplying bag storage racks 20, placing bags 30 containing the desired material into the bag storage racks 20, connecting the bags 30 to the material delivery hose 70, connecting the material delivery hose 70 to the hopper 40, creating a vacuum in the hopper 40 to draw material from the bags 30 through the material delivery hose 70 for collection in the hopper 40, and discharging the material collected in the hopper 40 into the drilling mud system 50 as desired.

The method also includes the additional steps of attaching load cells 25 to each bag storage rack 20 to continuously determine the weight of material discharging from each of said bags 30, providing remotely controllable bag discharge valves 24, providing a remotely controllable hopper discharge valve 48, and connecting the load cells 25, the pump 60, and the valves 24 and 48 to a programmable control panel 65 by leads 75 for remotely determining the flow of material from each bag 30 and for opening and closing said valves 24 to controlling the flow of materials from each bag 30 through the delivery hose 70 to the hopper 40, and for remotely controlling valve 48 and the pump 60 to produce a vacuum in the hopper 40 as desired and to discharge the material collected in the hopper 40 into the drilling mud system 50 in desired amounts.

It is thought that the apparatus and method of the present invention and many of its attendant advantages will be understood from the foregoing description and it will be apparent that various changes may be make in the form, construction, and arrangement of the parts thereof without departing from the spirit and scope of the invention or sacrificing all of its material advantages, the form described herein being merely a preferred or exemplary embodiment of the invention.

We claim:

1. An apparatus for delivering dry bulk material to a drilling mud system of an oil and gas well comprising:
   (a) a plurality of collapsible bags for holding a quantity of the dry bulk material, each of said bags having a tubular bag outlet portion extending from said bags;
   (b) a plurality of bag storage racks supporting said bags, each of said racks having a discharge outlet connected to said outlet portion of a respective one of said bags;
   (c) a hopper for receiving and collecting said material from said bags, said hopper having a material inlet port, a material discharge outlet port, a hopper outlet valve controlling discharge from said outlet port, and a vacuum stub opening for attaching a vacuum hose;
   (d) a length of material discharge hose, said discharge hose having an air inlet end, a plurality of material inlet hose ports, and a hopper connection end, said hopper connection end of said material discharge hose being connected to said material inlet port of said hopper and selected said material inlet hose ports of said material discharge hose being connected to selected said tubular bag outlet portions of said bags; and
   (e) a vacuum pump having a desired length of vacuum hose, said vacuum hose being connected to said vacuum stub opening of said hopper for producing a vacuum in said hopper and said material discharge hose and thereby drawing said material from said bags into said hopper.

2. The apparatus for delivering said dry bulk material to said drilling mud system of said oil and gas well as recited in claim 1, wherein said hopper outlet valve is remotely controllable.

3. The apparatus for delivering said dry bulk material to said drilling mud system of said oil and gas well as recited in claim 2, further comprising:
   a plurality of bag outlet discharge valves mounted to said discharge outlets of said racks to control a flow of said dry bulk material through said discharge outlets from said bags.

4. The apparatus for delivering said dry bulk material to said drilling mud system of said oil and gas well as recited in claim 3, wherein said bag outlet discharge valves are remotely controllable.

5. The apparatus for delivering said dry bulk material to said drilling mud system of said oil and gas well as recited in claim 4, further comprising:
   a plurality of load cells attached to said storage racks for measuring weight of said bags.

6. The apparatus for delivering said dry bulk material to said drilling mud system of said oil and gas well as recited in claim 5, further comprising:
   a control panel having control leads connected to said load cells, said hopper outlet valve, and said bag discharge valves for remotely controlling, in desired amounts, the flow of material from said bags to said hopper.

7. The apparatus for delivering said dry bulk material to said drilling mud system of said oil and gas well as recited in claim 6, wherein said control panel is programmable so that said material is automatically delivered to said hopper from selected said bags and in said desired amounts.

8. A method for delivering a desired quantity and type of dry bulk material to a drilling mud system of an oil and gas well comprising the steps of:
   (a) supplying a plurality of material storage bags to the well location, each of said bags containing a quantity of selected dry bulk material;
   (b) supplying a plurality of bag storage racks for supporting said bags;
   (c) placing said bags containing said quantity of selected dry bulk material into said bag storage racks;
   (d) providing a length of material delivery hose;
   (e) providing means for connecting each of said bags to said delivery hose;
   (f) connecting each of said bags to said material delivery hose;
   (g) providing a material collection hopper having means for connecting said hopper to said material delivery hose;
   (h) connecting said material delivery hose to said hopper;
   (i) creating a vacuum in said hopper whereby said selected dry bulk material in said bags is drawn from said bags through said material delivery hose and collected as the dry bulk material in said hopper; and
   (j) providing means for discharging said dry bulk material collected in said hopper from said bags; and
   (k) discharging said dry bulk material collected in said hopper from said hopper into said drilling mud system.

9. The method of delivering the dry bulk material to said drilling mud system of said oil and gas well as recited in claim 8, wherein the step of providing said means for connecting said bags to said material delivery hose includes the steps of
   (a) providing a discharge outlet connected to each of said bag storage racks;
   (b) connecting each said discharge outlet to a respective one of said bags; and
   (c) connecting each said discharge outlet to said material delivery hose.

10. The method of delivering the dry bulk material to said drilling mud system of said oil and gas well as recited in claim 9, further comprising the step of:
    (a) attaching load cells to said bag storage racks to continuously measure weight of said material discharging from each of said bags.

11. The method of delivering the dry bulk material to said drilling mud system of said oil and gas well as recited in claim 10, further comprising the steps of:
    (a) providing a plurality of remotely controllable bag discharge valves, a respective one of said bag discharge valves being connected to each said discharge outlet for controlling a flow of said material from said bags;
    (b) providing a remotely controllable hopper discharge valve to control a flow of said material from said hopper; and (c) connecting said load cells, said bag discharge valves, and said hopper valve to a programmable control panel for remotely determining an amount of the material flowing from each of said bags, and for remotely opening and closing said bag valves as desired for controlling the flow of said materials from said bags through said material delivery hose to said collection hopper, and for remotely opening and closing said hopper discharge valve for controlling the flow of said material from said hopper.

12. The method of delivering the dry bulk material to said drilling mud system of said oil and gas well as recited in claim 11, wherein said step of creating said vacuum in said hopper whereby said selected dry bulk material in said bags is drawn from said bags through said material delivery hose and collected as the dry bulk material in said hopper includes providing a vacuum pump connected to said hopper by a vacuum hose.

13. The method of delivering the dry bulk material to said drilling mud system of said oil and gas well as recited in claim 12, further comprising remotely controlling said vacuum pump.

14. The method of delivering the dry bulk material to said drilling mud system of said oil and gas well as recited in claim 13, wherein said remotely controlling said vacuum pump includes a programmable controlling means.

15. An apparatus for delivering desired dry material for injection into a well bore of an oil and gas well comprising:

(a) a liquid slurry system in communication with said well bore, said liquid slurry system having a tank for mixing said dry material;

(b) a hopper, said hopper having a material receiving port, a hopper discharge port, and a hopper discharge valve controlling discharge from said hopper discharge port, said hopper being positioned in relation to said liquid slurry system for delivering said desired dry material from said hopper discharge port into said tank of said liquid slurry system;

(c) a plurality of bags, each of said bags containing a selected dry material, each of said bags having a tubular sealable bag discharge outlet extending from said bags;

(d) a plurality of bag storage racks each of said storage racks supporting a respective one of said bags, each of said racks having a rack material discharge means, each said rack material discharge means having an inlet end, said inlet end being connected to a respective said sealable bag discharge outlet, and an outlet end;

(e) a material delivery hose, said material delivery hose being connected to said material receiving port of said hopper, and to said outlet end of each said rack discharge means; and (f) means for creating a vacuum in said hopper and thereby drawing said selected dry material from said bags, through said rack discharge means and said material delivery hose into said hopper for discharge as said desired dry material into said tank of said liquid slurry system through said hopper discharge port.

16. The apparatus as recited in claim 15, wherein said bag storage racks have funnel-shaped frameworks for supporting said bags at an angle of about sixty degrees from horizontal.

17. An apparatus for delivering desired dry material for injection into a well bore of an oil and gas well comprising:

(a) a liquid slurry system in communication with said well bore, said liquid slurry system having a tank for mixing said dry material;

(b) a hopper, said hopper having a material receiving port, a hopper discharge port, and a hopper discharge valve controlling discharge from said hopper discharge port, said hopper being positioned in relation to said liquid slurry system for delivering said desired dry material from said hopper discharge port into said tank of said liquid slurry system;

(c) a plurality of bags, each of said bags containing a selected dry material, each of said bags having a tabular sealable bag discharge outlet extending from said bags;

(d) a plurality of bag storage racks having funnel-shaped frameworks each for supporting a respective one of said bags at an angle of about sixty degrees from horizontal, each of said racks having a rack material discharge means, each said rack material discharge means having an inlet end, said inlet end being connected to a respective said sealable bag discharge outlet, and an outlet end, each of said racks having a respective housing connected to each said bag storage rack thereof, said housing having an inlet end and an outlet end, an inner annular collar mounted within each said housing, said inner annular collar having an upper collar inlet end for connection to said bag discharge outlet of a respective one of said bags and a lower collar outlet end for connection to said material delivery hose, and an outer annular collar positionable over and above said inner collar and said bag discharge outlet of the respective one of said bags when said bag discharge outlet is connected to said inner collar and thereby sealing said bag discharge outlet around said inner collar;

(e) a material delivery hose, said material delivery hose being connected to said material receiving port of said hopper, and to said outlet end of each said rack discharge means; and (f) means for creating a vacuum in said hopper and thereby drawing said selected dry material from said bags, through said rack discharge means and said material delivery hose into said hopper for discharge as said desired dry material into said tank of said liquid slurry system through said hopper discharge port.

18. The apparatus as recited in claim 17, further comprising:

(a) an iris diaphragm valve mounted to said inlet end of each said housing; and (b) a remotely controllable bag outlet valve mounted to said outlet end of each said housing.

19. The apparatus as recited in claim 18, wherein said hopper discharge valve is remotely controllable, said apparatus further comprising:

(a) a plurality of remotely monitorable load cells mounted to said bag storage racks for monitoring weight of said bags; and (b) a programmable control panel for monitoring and regulating flow of said material delivered from said bags to said liquid slurry system in desired amounts and in a desired sequence, said control panel being connected to said load cells, said hopper discharge valve, and said bag outlet valves by control leads.

20. The apparatus as recited in claim 19, wherein said liquid slurry system includes a drilling mud system.

* * * * *